H. BERDAN.

*Impt. in Cartridges.*

4491

REISSUED AUG 1 1871

Witnesses:

Jarry King.

P. T. Dodge

Inventor.

Hiram Berdan, by Dodge & Munn,

Attys.

UNITED STATES PATENT OFFICE.

HIRAM BERDAN, OF NEW YORK, N. Y., ASSIGNOR TO THE BERDAN FIRE-ARMS MANUFACTURING COMPANY, OF SAME PLACE.

IMPROVEMENT IN METALLIC CARTRIDGES.

Specification forming part of Letters Patent No. 82,587, dated September 29, 1868; reissue No. 4,491, dated August 1, 1871.

*To all whom it may concern:*

Be it known that I, HIRAM BERDAN, of New York, in the county of New York and State of New York, have invented certain new and useful Improvements in Cartridges; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to metallic cartridges; and it consists in combining in a cartridge certain features whereby a better and more efficient cartridge is produced than has heretofore been made, as hereinafter more fully explained.

Figure 1:
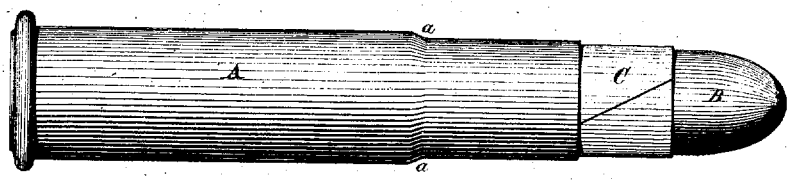
Figure 2:
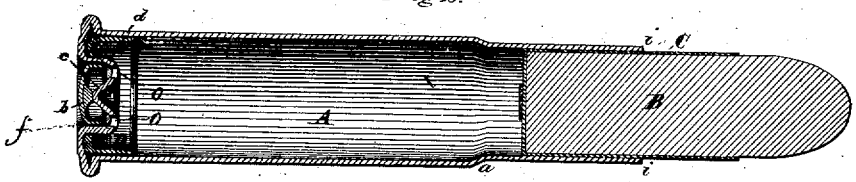
Figure 3:
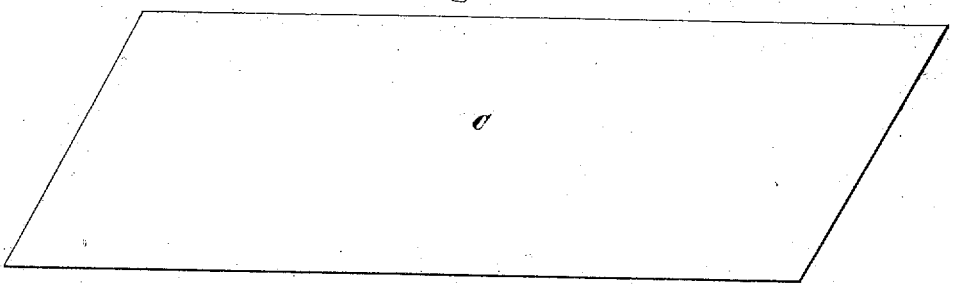

Figure 1 is a side view on an enlarged scale of my improved cartridge; Fig. 2, a longitudinal section of the same; and Fig. 3 is a plan of the patch before it is applied.

The object of my invention is to produce a superior cartridge for military arms, one which shall fulfill all the required conditions to a greater degree than any heretofore produced. In cartridges of this kind the following conditions are to be complied with: First, the ball must have great range, with a flat trajectory, and to obtain this it must have a large propelling charge. To withstand the explosive effect of this heavy charge the head of the shell must be made unusually strong. Second, in order to reduce the resistance of the atmosphere to the passage through it of the bullet it is necessary to reduce the diameter of the latter; and in order to retain its momentum it is necessary that the weight of the bullet shall not be lessened. To do this I make the bullet of less diameter, but of greater length, it being preferably two and a half or three diameters long. Third, as this elongated bullet will have a long bearing on the walls of the barrel it is necessary that it shall be patched in such a manner as to prevent leading, and at the same time pass through the barrel with the minimum of friction consistent with the insuring of its rotation; and, fourth, the body of the shell must be made of some material that will admit of the insertion of the patched bullet without bulging or misshaping the shell, and which shall, at the same time, hold the bullet firmly and accurately in place.

To make a cartridge which shall comply with these requirements I proceed as follows: In the first place I select a good quality of sheet-brass, from which I draw the shell by means of dies and punches in the usual manner. This material forms a shell that is more springy or elastic than the copper heretofore and generally used, and, being stronger and not so easily set, it permits the patched bullet to be shoved in with sufficient force to retain it securely in place and, at the same time, not bulge or swell out the front portion of the cartridge. I then form the head of the shell as represented in Fig. 2, by which a recess is produced on its exterior, with a point therein to act as an anvil for exploding a cap applied exteriorily—this feature being more fully described in a previous patent granted to me. I then form a cup, B, which has a hole at its center of such a size as to fit over or around the inwardly-projecting part of the head of the shell, this cup being inserted at the mouth or open end of the shell and pressed firmly down upon the base, as shown in Fig. 2. I then compress the front end of the shell A to a diameter corresponding with that of the bullet B, the compression extending back as far as the bullet is to be inserted, and as indicated between the letters *a i*, Fig. 2. I then make a bullet, which is of the form represented in Fig. 2, the same being from two and a half to three diameters in length. I next prepare a patch by cutting sheets of tough thin paper—bank-note paper being preferred—into strips of the form represented in Fig. 3. These strips I apply to the bullet by first moistening the paper and then rolling it smoothly and snugly around the bullet so as to cover the latter for nearly its entire length, and fold or twist its rear portion down over the rear end of the bullet, the end being secured by a little paste, if desired. This patch C should be of such a length as to make one or more complete turns around the bullet so as to envelop the latter on all sides with a uniform thickness, and thus insure its being perfectly centered in the bore of the gun when inserted therein. After the patch has dried, by which means the paper is contracted and made to fit the bullet smoothly and snugly, I then insert this patched bullet securely into the front end of the shell A, taking care to insert it far enough to hold it true and firmly in place, the shell, of course, having been previously filled with powder. A cap, *b*, is then applied to rear end of the shell, as shown in Fig. 2, and the cartridge is complete.

It is obvious that in case it be desired to make this style of cartridge of a smaller size for use in pistols or other smaller arms, then the cup B may be omitted; and it is also obvious that the brass shell and patched bullet may be used with the fulminate arranged within the shell; but in such case the shell cannot be refired, which I consider a great object, because in case of necessity, where, for instance, a new supply cannot be readily obtained, these shells can be reloaded and used many times over. By this method of constructing a cartridge I am enabled to produce an article much superior to anything of its kind heretofore known. The paper patch is the only thing that can be relied upon to adhere to the bullet and pass with it through the bore of the gun, and thus prevent leading. A cartridge made on this plan has sufficient strength to withstand the effect of a large charge, thus insuring great range, a flat trajectory and consequent accuracy of flight of bullet. By reduction of the diameter and lengthening the bullet its momentum is preserved, while its resistance in passing through the air is lessened, and by means of the paper patch the leading of the barrel is prevented and the friction thereby kept at its minimum, thus fulfilling all the required conditions for success.

Having thus described my invention, what I claim is—

1. The combination of the drawn brass shell with the patched bullet, substantially as described.

2. The combination of the metallic shell with a paper-patched bullet and a re-enforce cup, all constructed and arranged to operate as set forth.

3. The combination of the metallic shell A with the paper-patched bullet, and a cap or primer applied exteriorly, substantially as described, whereby the same shell may be repeatedly used, as set forth.

HIRAM BERDAN.

Witnesses:
HENRY MARVAL,
ISAAC BRADLEY.